United States Patent [19]

Elliott, Jr. et al.

[11] 3,867,310

[45] Feb. 18, 1975

[54] CATALYST COMPOSITIONS

[75] Inventors: Curtis H. Elliott, Jr., Baltimore; Hanson Lee Guidry, Bel Air, both of Md.

[73] Assignee: W. R. Grace & Co., New York, N.Y.

[22] Filed: May 8, 1972

[21] Appl. No.: 251,073

[52] U.S. Cl. ............................................. 252/455 Z
[51] Int. Cl. ................................................ B01j 11/40
[58] Field of Search ................................. 252/455 Z

[56] References Cited
UNITED STATES PATENTS

| | | | |
|---|---|---|---|
| 3,329,628 | 7/1967 | Gladrow et al. | 252/453 |
| 3,449,265 | 6/1969 | Gladrow et al. | 252/455 Z |
| 3,556,988 | 1/1971 | Stover et al. | 252/455 Z |
| 3,592,778 | 7/1971 | Vesely | 252/455 Z |
| 3,657,154 | 4/1972 | Haden, Jr. et al. | 252/455 Z |

*Primary Examiner*—C. Dees
*Attorney, Agent, or Firm*—Joseph P. Nigon

[57] ABSTRACT

Hydrocarbon conversion catalysts are prepared by combining partially crystallized synthetic faujasite with amorphous silica, alumina, silica-alumina hydrogel and/or clay.

5 Claims, No Drawings

CATALYST COMPOSITIONS

Hydrocarbon conversion catalysts which contain crystalline alumino silicates (zeolites) have been commercially available for many years. These zeolite containing catalysts have normally been prepared by a variety of techniques wherein a zeolite such as synthetic faujasite is prepared separately as a substantially pure compound. The zeolite is then added to catalysts such as amorphous silica-alumina hydrogels and/or clay.

In view of the fact commercial catalysts must be relatively porous in order to present a large catalytic surface during use, considerable difficulty is encountered with catalysts which are physically weak, i.e., possess low resistance to attrition. Low attrition resistance in commercial fluid cracking catalysts which contain relatively large quantities of finely divided zeolite and clay has been especially troublesome. Particulrly in view of the fact most commercial cracking catalyst compositions now contain substantial quantities of both zeolite and clay. Furthermore strict controls on environmental pollution have been placed in effect which restrict the quantity of catalyst which refiners may vent to the atmosphere.

Attempts to improve attrition resistance of zeolite containing catalysts by the addition of expensive binders and/or through the application of special processing techniques have frequently resulted in undesirable modification of catalytic properties and have considerably increased the manufacturing costs of commercial catalysts.

It is therefore an object of the present invention to provide an improved zeolite containing hydrocarbon conversion catalyst composition.

It is another object to provide an inexpensive expedient by which the attrition resistance of cracking catalyst which contains synthetic faujasite and/or clay may be improved.

It is a further object to provide an attrition resistant faujasite containing fluid cracking catalyst which possesses a high degree of catalytic activity and desired selectivity.

These and other objects will become readily apparent to one skilled in the art from the following detailed description and specific examples.

Broadly our invention contemplates a procedure for preparing catalysts wherein a partially crystallized synthetic faujasite is combined with amorphous silica, alumina, or silica-alumina hydrogel and/or clay.

More specifically, we have found that a valuable attrition resistant hydrocarbon conversion catalyst may be prepared by procedure which may be outlined as follows:

1. A partially crystallized faujasite precursor reaction mixture is prepared by combining silica, alumina, alkali metal hydroxide, and water in amounts which are conventionally known to produce faujasite. The mixture is reacted for a period sufficient to product from about 5 to 70 percent of the crystalline faujasite which may be theoretically produced from the reaction mixture.

2. The partially crystalline faujasite mixture is combined with desired quantities of silica, alumina, silicaalumina hydrogel and/or clay.

3. The mixture of catalyst components is formed into desirable particles, preferably by spray drying.

4. The formed catalyst product is then washed, ion exchanged to lower the alkali metal content thereof and to increase its thermal stability.

The partially crystalline faujasite utilized in the practice of the present invention is prepared by reacting a faujasite reaction mixture comprising silica, alumina and sodium hydroxide and water under conditions which will produce faujasite, however, the reaction period employed is restricted at that point wherein from about 5 to 70 percent crystalline faujasite is actually produced. The determination of the exact reaction period used will depend upon reaction temperatures employed and the particular technique utililzed in the production of the faujasite. The determination of the percent crystallinity of the reaction mixture is determined by utilization of standard surface area measurement or X-ray diffraction techniques. For example, to determine the actual reaction period to be utilized in the production of the presently contemplated partially crystalline faujasite, the faujasite reaction mixture is first reacted under conditions wherein the substantial theoretical amount of the crystalline faujasite, that is the maximum amount of crystalline faujasite obtainable from such reaction mixture, is prepared. The crystallinity of the faujasite is determined and is arbitrarily considered to possess 100 percent crystallinity and since surface area is substantially proportioned to crystallinity, this sample will possess maximum surface area usually 800– 900 m$^2$/g as determined by standard nitrogen adsorption methods. Next a series of similar preparation is made wherein the reaction period is terminated after various increments of time less than that necessary to produce the theoretical amount of crystalline faujasite. The X-ray patterns and/or surface areas for these products are determined and compared with that obtained for a fully crystallized faujasite batch. The percent of crystallinity is readily obtained for these partially crystalline products by comparing the peak X-ray heights or areas and/or surface areas obtained for the partially crystalline material with that obtained for the arbitrarily stated 100% crystalline material.

The partially crystalline faujasite is described as having a percentage of the maximum crystallinity, for example a product having a surface area of 200 m$^2$/g is described as possessing 25 percent crystallinity of a fully crystallized product which possesses a surface area of 800 m$^2$/g, i.e. percent crystallinity = 200 m$^2$/g/800 m$^2$/g × 100 = 25%.

The reaction mixture used to prepare the partially crystalline faujasite will contain a ratio of alumina to silica to alkali metal hydroxide to water which will produce a synthetic faujasite having a silica-alumina ratio ranging from as low as 2.4 to about 6 and preferably from about 3.5 to 5. The range of ratios of silica to alumina to alkali metal hydroxide to water which may be utilized may be stated as follows:

For a synthetic faujasite having a silica to alumina ratio of 2.4 – 3.0:

| | |
|---|---|
| $SiO_2/Al_2O_3$ | 3 to 5 |
| $Na_2O/SiO_2$ | 1.2 to 1.5 |
| $H_2O/Na_2O$ | 35 to 60 |

For a synthetic faujasite having a silica to alumina ratio of 3.0 to 7.0 several ranges of ingredients may be used:

|   | 1 | 2 | 3 | 4 |
|---|---|---|---|---|
| $SiO_2/Al_2O_3$ | 7–40 | 10–30 | 7–30 | 8–30 |
| $Na_2O/SiO_2$ | 0.2–0.4 | 0.4–0.6 | 0.6–0.8 | 0.6–1.0 |
| $H_2O$ | 25–60 | 20–60 | 20–60 | 12–90 |

When the above reactants are combined and heated at a temperature of from about 95° to 105°C. for a period of from about 10 minutes to 24 hours, depending upon the procedure used, it is found that faujasite is obtained which is essentially 100% crystalline. However, when the reaction period is reduced to a period ¼ to ¾ of that given above, it is found that faujasite products are obtained which are only about 5 to 70 percent crystalline when compared to that obtained for the reaction period to fully crystallize the faujasite.

By utilizing what is called the faujasite seeding technique such as that disclosed in U.S. Pat. Nos. 3,574,538 and 3,639,099 to McDaniel et al it is found that the above stated reaction periods may be considerably reduced. Where a seeding technique is utilized a first reaction mixture is prepared by reacting silica-alumina alkali metal hydroxide and water in appropriate ratios under conditions of time and temperature which yield a finely divided silica-alumina seed particle having a particle size of less than about 0.1 microns. These seed particles do not exhibit X-ray crystallinity which is detectable using standard X-ray diffraction pattern techniques. These seed particles however, are extremely active in the rapid promotion of crystalline faujasite from a standard faujasite precursor reaction mixture such as that described above.

To prepare seed particles which may be utilized in the production of the presently contemplated partially crystalline faujasite reaction mixtures of sodium silicate, sodium aluminate, sodium hydroxide (or equivalents thereof) and water in ratios set forth below are reacted for a period of more than 2 hours at a temperature of 15° to 35°C. The desired molar reaction ratios used to prepare the seed particles are summarized below:

| | |
|---|---|
| $Na_2O$ | 15±2 |
| $Al_2O_3$ | 1 |
| $SiO_2$ | 14±2 |
| $H_2O$ | 350±50 |

In the above description of the preparation of the faujasite and the seed particles used to promote the formation of faujasite, the alumina utilized may be derived from any one of a number of sources such as sodium aluminate, aluminum sulfate, and aluminum chloride. The silica component may be derived from sources such as sodium silicate, silica gel, finely divided silica, and precipitated silica.

Once the desired partially crystalline faujasite is obtained, it may be mixed with the other catalyst ingredients required to produce a zeolite containing cracking catalyst. Alternatively, the partially crystalline faujasite may be formed into catalysts which comprise essentially 100 percent of the partially crystalline faujasite.

Additional catalyst ingredients which may be mixed with the partially crystalline faujasite include clay, silica, alumina, silica-alumina hydrogel, and if desired, additional crystalline alumino silicate promoters such as stabilized faujasite. However, it is generally contemplated that the zeolite promoter required for preparation of the present catalyst is primarily provided by the partially crystalline material. In general, it is found that from about 10 to 100 percent by weight of the finished catalyst may be provided by the partially crystalline faujasite product.

Where it is desired to produce a catalyst which contains clay, it is contemplated that the finished catalyst may contain anywhere from about 0 to 50 percent by weight clay and the remainder may comprise the partially crystalline faujasite which acts as both zeolite promoter and binder for the clay to produce dense attrition resistance particles. It is also contemplated that the partially crystalline faujasite may be combined with alumina, silica-alumina and/or silica-alumina hydrogel. It is also contemplated that both clay and silica-alumina or silica-alumina hydrogel may be combined with the partially crystalline faujasite to obtain a multicomponent catalyst preparation.

The technique utilized for combining the partially crystalline faujasite with the additional catalyst components generally involves thorough admixture of the partially crystalline faujasite with the other catalyst components followed by gelation with carbon dioxide or mineral acid. It is also contemplated that finely divided particulate alumina may be combined with the partially crystalline faujasite and the mixture spray dried and calcined to produce an attrition resistant, alumina-faujasite promoted catalyst composition.

The technique utilized to form the fluidized form of the present catalysts having a particle size of 50 to 200 involves spray drying. However, it is also contemplated that particulate catalysts having larger particle sizes may be prepared using standard pilling or granulation techniques. These techniques are used when it is desired to obtain so-called fixed or moving bed catalysts which possess particle sizes on the order of ⅛ to ¼ inches.

The washing of the catalyst is primarily done with an ammonium salt solution such as aqueous ammonium sulfate in order to remove excess alkali metal salts to a level of less than 1 percent by weight and more preferred to less than 0.5 percent by weight $Na_2O$. The catalysts may also be exchanged with polyvalent metal ions such as rare earths in order to obtain a more stable zeolite component. Exchange with polyvalent metal ions as well as soda removal by exchange with ammonium salts is well known to those skilled in the art.

Catalysts obtained by way of the presently contemplated procedures possess substantial activity for the cracking of hydrocarbons. It is generally found that while the partially crystallilne faujasites of this invention do not quite possess the activity of fully crystalline faujasite, the partially crystalline faujasite containing catalyst contemplated herein will possess activity for the cracking of hydrocarbons which is much higher than would be expected for catalysts having such a low degree of crystallinity.

The attrition resistance obtained for the presently contemplated catalysts is particularly good, primarily due to the fact the partially crystallilne faujasite preparation contemplated herein apparently serves as both a highly active catalyst promoter and as an efficient binder for the catalyst particles. It is found that the attrition resistance of typical catalyst compositions prepared herein possess Davison Indexes on the order of 12 to 25 and Jersey Indexes on the order of 1.0 to 2.5.

The Davison attrition resistance as set forth in U.S. Pat. No. 3,650,988.

Having described the basic aspects of the present invention, the following examples are given to illustrate specific embodiments thereof.

EXAMPLE I

Preparation of Partially Crystallized NaY

A sodium silicate solution was prepared by adding 1,000 gallons $H_2O$ to 3360 gallons of 30.7° Be sodium silicate. Then 450 gallons of sodium aluminate solution (made by dissolving 1,225 lbs. $Al_2O_3$ hydrate in 1830 lbs. of 50% NaOH solution then diluting with 235 gallons of water) was added to the silicate solution. The resulting slurry was agitated for 1 hour. 500 gallons of seed solution (made by reacting 1295 No. 50% NaOH and 324 No. $H_2O$ with 110 No. $Al_2O_3$ hydrate then diluting with 890 No. $H_2O$, then mixing with 2841 No. 30.7° Be sodium silicate) was added to the silicate-aluminate slurry. The seeded slurry was agitated 45–60 minutes. The mixture was heated to 212°F and held above 206°F. 100 percent crystallization is effected in normal production in 12 hours at temperature at which time the temperature is lowered to 160°F by the addition of cold water. In order to obtain partially crystallized material at various degrees of crystallinity, 50 gallon samples were drawn from a batch 4 hrs., 5 hrs., and 6 hrs. after start of heat up. These samples were quenched after taken to stop crystallization. Analysis of washed solids from these samples were as follows:

| Sample | A (4 hrs) | B (5 hrs) | C (6 hrs) | D (12 hrs) |
|---|---|---|---|---|
| % $Al_2O_3$ (D.B.) | 19.90 | 19.66 | 20.38 | 20.15 |
| % $SiO_2$ (D.B.) | 68.81 | 68.87 | 65.84 | 64.86 |
| Surface Area (m²/g) | 95 | 120 | 202 | 825 |
| % Crystallinity (by X-ray) | 5 | 12 | 28 | 100 |
| % Crystallinity (by Surface Area) | 11.5 | 14.5 | 24.5 | 100 |

EXAMPLE II

Preparation of Catalyst Containing partially Crystallized NaY

The three samples of partially crystallized NaY obtained in 4 hrs., 5 hrs., and 6 hrs. in Example I were made into catalysts by the procedures set forth in descriptions A, B and C below:

A. Partially crystallized NaY obtained in 4 hrs.

The partially crystallized faujasite was separated from the silicate containing mother liquor by filtration. The mother liquor was combined with 24.5 lbs. of sodium silicate solution containing 28.7% $SiO_2$ and 8.7% $Na_2O$ to make 45 gallons of silicate and mother liquor mixture containing 17.9 grams per liter $Na_2O$ and 43 grams per liter $SiO_2$. The 45 gallons mixture was combined with 4780 grams of Kaolin. The liquor slurry was then pumped at a rate of one gallon per minute through a heated reaction coil into which carbon dioxide was passed at a rate such that gelation of the stream occurred in 2 minutes at 80°F. The gelation was continued for 25 minutes to obtain a gelled stream possessing a pH of 10.05. The gel mixture was aged for 5 minutes while the volume was adjusted to 75.6 liters. 11.08 liters of alum solution containing 97.9 g/l $Al_2O_3$ were added to obtain a pH of 4.3. The pH was adjusted to 7.65 by the addition of 1,900 ml of 23% ammonia. Subsequently 10.1 pounds washed sodium faujasite cake obtained from the faujasite synthesis was added. This cake contained 35 percent solids. The mixture was recirculated and agitated for an hour and then filtered to obtain 101 pounds of catalyst filter cake. The cake was reslurried with 14 liters of water then homogenized and spray dried at a temperature of 170°F.

1800 g. of spray dried product was then exchanged with ammonium sulfate solution at a pH of about 7.5 to obtain a product which contained 0.5 percent by weight $Na_2O$. The exchanged filter cake was reslurried with water and the pH thereof was adjusted to 5.0 by the addition of 6% $H_2SO_4$. The reslurried material was then exchanged with rare earth chloride solution which contained 66.8 grams $ReCl_3$, $6H_2O$. The filter cake was exchanged with the rare earth chloride solution at a temperature of 160°F for a period of 30 minutes. The resulting product was filtered and rinsed with water, then dried at a temperature of 300°F to obtain a catalyst having the following analysis: 2.74% $Re_2O_3$, 15.7 percent partially crystallized faujasite (silica-alumina basis) 24.3 percent clay, 60 percent synthetic silica-alumina hydrogel containing 25.0 percent by weight $Al_2O_3$.

B. Partially crystallized NaY obtained in 5 hrs.

The partially crystallized faujasite was separated from the silicate containing mother liquor by filtration. The mother liquor was combined with 24.5 lbs. of sodium silicate solution containing 28.7% $SiO_2$ and 8.7% $Na_2O$ to make 45 gallons of silicate and mother liquor mixture containing 18.85 grams per liter $Na_2O$ and 43 grams per liter $SiO_2$. The 45 gallons mixture was combined with 4780 grams of kaolin. The liquor slurry was then pumped at a rate of one gallon per minute through a heated reaction coil into which carbon dioxide was passed at a rate such that gelation of the stream occurred in 2 minutes at 80°F. The gelation was continued for 25 minutes to obtain a gelled stream possessing a pH of 10.0. The gel mixture was aged for 5 minutes while the volume was adjusted to 75.6 liters. 11.08 liters of alum solution containing 97.9 g/l $Al_2O_3$ were added to obtain a pH of 4.3. The pH was adjusted to 7.7 by the addition of 1850 ml. of 23 percent ammonia. Subsequently 10.1 pounds washed sodium faujasite cake obtained from the faujasite synthesis was added. This cake contained 35 percent solids. The mixture was recirculated and agitated for an hour and then filtered to obtain 98 pounds of catalyst filter cake. The cake was reslurried with 14 liters of water then homogenized and spray dried at a temperature of 170°F.

1,800 g. of spray dried product was then exchanged with ammonium sulfate solution at a pH of about 7.5 to obtain a product which contained 0.5 percent by weight $Na_2O$. The exchanged filter cake was reslurried with water and the pH thereof was adjusted to 5.0 by the addition of 6% $H_2SO_4$. The reslurried material was then exchanged with rare earth chloride solution which contained 86.0 grams $ReCl_3$, $6 H_2O$. The filter cake was exchanged with a rare earth chloride solution at a temperature of 160°F. for a period of 30 minutes. The resulting product was filtered and rinsed with water, then dried at a temperature of 300°F to obtain a catalyst having the following analysis: 4,40% $Re_2O_3$, 15.7 percent partially crystallized faujasite (silica-alumina basis) 24.3 percent clay, 60 percent synthetic silica-alumina hydrogel containing 25.0 percent by weight $Al_2O_3$.

C. Partially crystallized NaY obtained in 6 hrs.

The partially crystallized faujasite was separated from the silicate containing mother liquor by filtration. The mother liquor was combined with 24.5 lbs. of sodium silicate solution containing 28.7% $SiO_2$ and 8.7% $Na_2O$ to make 45 gallons of silicate and mother liquor mixture containing 18.6 grams per liter $Na_2O$ and 43 grams per liter $SiO_2$. The 45 gallons mixture was combined with 4780 grams of kaolin. The liquor slurry was then pumped at a rate of 1 gallon per minute through a heated reaction coil into which carbon dioxide was passed at a rate such that gelation of the stream ocurred in 2 minutes at 80°F. The gelation was continued for 25 minutes to obtain a gelled stream possessing a pH of 10.0. The gel mixture was aged for 5 minutes while the volume was adjusted to 75.6 liters. 11.08 liters of alum solution containing 97.9 g/l $Al_2O_3$ were added to obtain a pH of 4.3. The pH was adjusted to 7.7 by the addition of 1800 ml. of 23 percent ammonia. Subsequently 10.1 pounds washed sodium faujasite cake obtained from the faujasite synthesis was added. This cake contained 32.55 percent solids. The mixture was recirculated and agitated for an hour and then filtered to obtain 98 pounds of catalyst filter cake. 43 pound cake was reslurried with 6 liters of water then homogenized and spray dried at a temperature of 170°F.

1,800 g. of spray dried product was then exchanged with ammonium sulfate solution at a pH of about 7.5 to obtain a product which contained 0.5 percent by weight $Na_2O$. The exchanged filter cake was reslurried with water and the pH thereof was adjusted to 5.0 by the addition of 6% $H_2SO_4$. The reslurried material was then exchanged with rare earth chloride solution which contained 66.5 grams $ReCl_3$, $6H_2O$. The filter cake was exchanged with a rare earth chloride solution at a temperature of 160°F. for a period of 30 minutes. The resulting product was filtered and rinsed with water, then dried at a temperature of 300°F. to obtain a catalyst having the following analysis: 3.34% $Re_2O_3$, 15.7% partially crystalline faujasite (silica-alumina basis 24.3 percent clay, 60 percent synthetic silica-alumina hydrogel containing 25.0 percent by weight $Al_2O_3$.

D. Fully crystallized NaY obtained in 12 hrs.

The procedure of C. above was repeated, however, fully crystalline NaY was used. The catalyst possessed the following analysis: 4.12% $RE_2O_3$; 15.7% fully crystalline faujasite (silica-alumina basis), 24.3% clay; and 60% synthetic silica-alumina hydrogel containing 25.0% by weight $Al_2O_3$.

EXAMPLE III

To illustrate the catalytic activity of the catalysts prepared in Example II, the following data was obtained:

Table

| Catalyst (Example) | Crystallinity of Nay (%) | Amount Nay (wt.% Si/Al basis) | Attrition DI | JI | Microactivity 1050 | 1070 | 1350 | Microactivity % of II D 1050 | 1070 | 1350 |
|---|---|---|---|---|---|---|---|---|---|---|
| II A | 5 | 15.7 | 14 | 2.0 | 75.3 | 67.6 | 63.7 | 82.3 | 81.4 | 70.4 |
| II B | 12 | 15.7 | 25 | 1.7 | 82.9 | 77.4 | 76.5 | 90.6 | 93.1 | 84.7 |
| II C | 28 | 15.7 | 21 | 2.4 | 87.0 | 80.1 | 84.2 | 95.1 | 96.5 | 93.0 |
| II D | 100 | 15.7 | 43 | 4.5 | 91.5 | 83.0 | 90.5 | 100 | 100 | 100 |

The microactivity was determined by using the method set forth by F. G. Ciapetta et al in Oil & Gas Journal, Oct. 16, 1967. The feedstock was West Texas Gas Oil having a boiling range of 500°–800°F. The reactor temperature was 900°F. and a weight hourly space velocity of 2 was used. Prior to testing the catalyst samples were deactivated as follows: 1050°F. steam at 60 PSIG for 24 hours; 1070°F. steam at 90 PSIG for 24 hours; and 1350°F. steam at 15 PSIG for 8 hours. In the last three columns of the Table the calculated percent activity of the sample II D is given. This data clearly shows that, while the catalyst samples II A, II B and II C of the present invention possess only a fraction of the crystallinity of the fully crystalline faujasite containing standard sample II D, these catalysts possess a high degree of activity and thermal stability. Furthermore, the catalysts of our invention possess excellent resistance to attrition.

The above examples clearly indicate that by using the technique set forth in the present invention active attrition resistant hydrocarbon conversion catalysts may be economically obtained.

We claim:

1. A method for preparing a hydrocarbon conversion catalyst which comprises:
   a. preparing a mixture of sililca, alumina, alkali metal hydroxide, and water in ratios required to produce synthetic faujasite,
   b. reacting said mixture for a period sufficient to produce from about 5 to 70 percent of the crystalline synthetic faujasite which may be theoretically produced from said reaction mixture,
   c. combining the product of step (b) with a member selected from the group consisting of silica, alumina, silica-alumina hydrogel, clay and mixtures thereof;
   d. forming said mixture into a particulate catalyst composite, and
   e. washing said catalyst composite to lower the soda content thereof to less than about 1 percent by weight.

2. The method of claim 1 wherein said faujasite precursor mixture is reacted for a period of from about 5 minutes to 12 hours at a temperature of from 95° to 105°C.

3. The method of claim 1 wherein said faujasite reaction mixture is combined with amorphous silica-alumina seed particles having a particle size of less than about 0.1 micron.

4. The method of claim 1 wherein clay comprises 0 to 50 percent by weight of said catalysts.

5. The method of claim 1 wherein said catalyst is exchanged with rare earth ions.

* * * * *